US011688284B2

(12) United States Patent
Haugh et al.

(10) Patent No.: US 11,688,284 B2
(45) Date of Patent: *Jun. 27, 2023

(54) CONTROL SYSTEM FOR PLATOONING OF VEHICLES

(71) Applicant: OMNITRACS, LLC, Dallas, TX (US)

(72) Inventors: Kevin Haugh, Alexandria, VA (US); Philip Friedman, Dallas, TX (US); Jeffrey Champa, Heath, TX (US); Wesley Mays, Coppell, TX (US)

(73) Assignee: Omnitracs, LLC, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/694,273

(22) Filed: Mar. 14, 2022

(65) Prior Publication Data

US 2022/0198938 A1 Jun. 23, 2022

Related U.S. Application Data

(63) Continuation of application No. 16/431,347, filed on Jun. 4, 2019, now Pat. No. 11,282,396.

(60) Provisional application No. 62/806,468, filed on Feb. 15, 2019.

(51) Int. Cl.

| | |
|---|---|
| ***G08G 1/00*** | (2006.01) |
| ***G06Q 10/0631*** | (2023.01) |
| ***G01C 21/34*** | (2006.01) |
| ***G08G 1/123*** | (2006.01) |
| ***G08G 1/0968*** | (2006.01) |
| ***G08G 1/0967*** | (2006.01) |

(52) U.S. Cl.

CPC ........... *G08G 1/22* (2013.01); *G01C 21/3453* (2013.01); *G06Q 10/06315* (2013.01); *G08G 1/202* (2013.01); *G08G 1/0967* (2013.01); *G08G 1/0968* (2013.01); *G08G 1/123* (2013.01)

(58) Field of Classification Search

CPC ........ G08G 1/22; G08G 1/202; G08G 1/0967; G08G 1/0968; G08G 1/123; G01C 21/3453; G06Q 10/06315

See application file for complete search history.

(56) References Cited

U.S. PATENT DOCUMENTS

| | | | | |
|---|---|---|---|---|
| 9,940,840 | B1 * | 4/2018 | Schubert | G01C 21/3407 |
| 10,458,809 | B2 * | 10/2019 | Flores | G08G 1/0969 |
| 2016/0300186 | A1 | 10/2016 | Scharaswak et al. | |
| 2017/0017927 | A1 * | 1/2017 | Domnick | B60W 50/0097 |

(Continued)

FOREIGN PATENT DOCUMENTS

| | | | | |
|---|---|---|---|---|
| CN | 109147312 A * | 1/2019 | | G08G 1/22 |
| WO | 2019014372 A1 | 1/2019 | | |

OTHER PUBLICATIONS

European Search Report in EP20754975.9, dated Oct. 4, 2022, 3 pages.

*Primary Examiner* — Behrang Badii
*Assistant Examiner* — Jay Khandpur
(74) *Attorney, Agent, or Firm* — ArentFox Schiff LLP

(57) ABSTRACT

Aspects of the present disclosure provide a network control center that coordinates candidate vehicles suited for platooning based at least in part on the hours of service (HOS) requirements, customer constraints, and service time of each candidate vehicle. Further, the network control center may integrate a navigation system that incorporates one or more of the above factors to manage logistics associated with platooning vehicles.

20 Claims, 6 Drawing Sheets

(56) References Cited

U.S. PATENT DOCUMENTS

2017/0116668 A1* 4/2017 Rodoni ................ G06Q 20/102
2018/0080777 A1 3/2018 Nimchuk et al.
2018/0188746 A1* 7/2018 Lesher ................ G05D 1/0287
2018/0211546 A1* 7/2018 Smartt .................... H04W 4/46

* cited by examiner

CONTROL SYSTEM FOR PLATOONING OF VEHICLES

CROSS-REFERENCE TO RELATED APPLICATION(S)

This application is a continuation of U.S. patent application Ser. No. 16/431,347, entitled "Control System For Platooning Of Vehicles" and filed Jun. 4, 2019, which claims benefit of U.S. Provisional Application Ser. No. 62/806,468, entitled "Control System For Platooning Of Vehicles" and filed Feb. 15, 2018, which is expressly incorporated by reference herein in its entirety.

BACKGROUND

Aspects of the present disclosure relate generally to controlling the cooperative operation of vehicles, and more particularly, to controlling vehicle platooning.

Platooning refers to linking of two or more vehicles in a convoy, using connectivity technology and automated driving support systems. During platooning, the vehicles may maintain a preset close distance between each other when they are connected for at least portions of a journey (e.g., highway driving). In such systems, the vehicle at the head of the platoon may act as the leader, with the vehicles behind reacting and adapting to changes in its movement. Platooning of commercial vehicles, such as trucks or tractor-trailers, may offer a number of benefits over conventional systems in terms of making road transport safer, cleaner, and more efficient. For example, truck platooning may lower fuel consumption given that trucks can drive closer together and benefit from reduced air-drag friction.

Recent developments in the truck platooning systems have focused on communication techniques to ensure that the vehicles, during platooning, maintain connectivity for proper distance and reactive automated braking. However, such systems generally operate with a presumption that all vehicles, when initiating the platooning, are similarly situated with respect to hours of service (HOS) availability for drivers associated with the vehicles. For example, in the United States, current HOS regulations limit the number of hours a driver of the commercial vehicle can work per day to a 14 hour on-duty period, including a maximum of 11 hours driving. In practical applications, similar HOS availability between platooning candidate vehicles may not be frequent given that different drivers may be at different periods of "on-duty" time for any particular day. In such instances, if a vehicle with low HOS availability for a driver is linked in a platooning convoy with other vehicles with greater HOS availability, the platooning convoy may need to cease or reorganize mid-route when one vehicle exhausts its HOS requirements.

Additionally, when organizing a platooning convoy, the current platooning systems fail to consider factors such as pick-up and/or delivery time constraints (e.g., when does a vehicle need to be at a particular destination), actual service time (e.g., how long would loading/unloading of a vehicle take at the shipper facility that may impact availability of a candidate vehicle), or logistics (how far any one vehicle can participate in platooning on a route). For instance, although a candidate vehicle may initially be suitable for being included in a platooning convoy (e.g., by virtue of having equipment needed for platooning), the candidate vehicle may be an inefficient addition to the platoon due to service and/or pick-up/delivery time constraints.

Thus, there is a need for improved control systems for organizing and navigating a platooning convoy.

SUMMARY

Aspects of the present disclosure solve the above-identified problem by implementing a network control center that coordinates candidate vehicles suited for platooning based at least in part on the HOS requirements, customer constraints, and service time of each candidate vehicle. Further, the network control center may integrate a navigation system that incorporates one or more of the above factors to manage logistics associated with platooning vehicles.

In one example, a method for managing fleet vehicles for platooning is described. In some aspects, the method may include receiving, via a communication network, a plurality of electronic signals conveying a plurality of vehicle information for a plurality of vehicles, each vehicle information including at least a vehicle identifier of the vehicle, a driver identifier of a driver of the vehicle, available hours of service (HOS) for each driver associated with the plurality of vehicles, and vehicle location information, wherein the plurality of vehicles are equipped with communication and safety systems that facilitate vehicle platooning. The method may further include identifying a first subset of the plurality of vehicles that are candidates for platooning in a geographic area based on the plurality of vehicle information. The method may also include selecting at least one second subset of vehicles to be included in at least one platooning convoy from the first subset of the plurality of vehicles that are candidates for platooning in the geographic area based in part on the available HOS for the each driver. The method may additionally include transmitting, via the communication network, a platooning configuration to the at least one second subset of vehicles for initiating the at least one platooning convoy.

In another example, a network-based control computer for controlling vehicles for platooning is disclosed. The network-based control computer may include a memory configured to store instructions; and a processor communicatively coupled with the memory. The processor may be configured to execute the instructions to receive, via a communication network, a plurality of electronic signals conveying a plurality of vehicle information for a plurality of vehicles, each vehicle information including at least a vehicle identifier of the vehicle, a driver identifier of a driver of the vehicle, available HOS for each driver associated with the plurality of vehicles, and vehicle location information; wherein the plurality of vehicles are equipped with communication and safety systems that facilitate vehicle platooning. The network-based control computer may further include instructions to identify a first subset of the plurality of vehicles that are candidates for platooning in a geographic area based on the plurality of vehicle information, and select at least one second subset of vehicles to be included in at least one platooning convoy from the first subset of the plurality of vehicles that are candidates for platooning in the geographic area based in part on the available HOS for the each driver. The network-based control computer may further include instructions to transmitting, via the communication network, a platooning configuration to the at least one second subset of vehicles for initiating the at least one platooning convoy.

In another example, a non-transitory computer readable medium storing instructions, executable by a processor of a computer device for managing fleet vehicles for platooning are disclosed. The computer readable medium may include instructions for receiving, via a communication network, a plurality of electronic signals conveying a plurality of vehicle information for a plurality of vehicles, each vehicle information including at least a vehicle identifier of the vehicle, a driver identifier of a driver of the vehicle, available HOS for each driver associated with the plurality of vehicles, and vehicle location information, wherein the plurality of vehicles are equipped with communication and safety systems that facilitate vehicle platooning. The computer readable medium may further include instructions for identifying a first subset of the plurality of vehicles that are candidates for platooning in a geographic area based on the plurality of vehicle information, and selecting at least one second subset of vehicles to be included in at least one platooning convoy from the first subset of the plurality of vehicles that are candidates for platooning in the geographic area based in part on the available HOS for the each driver. The computer readable medium may further include instructions for transmitting, via the communication network, a platooning configuration to the at least one second subset of vehicles for initiating the at least one platooning convoy.

The above presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the present disclosure in a simplified form as a prelude to the more detailed description that is presented later.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which.

DETAILED DESCRIPTION

Figure 1:
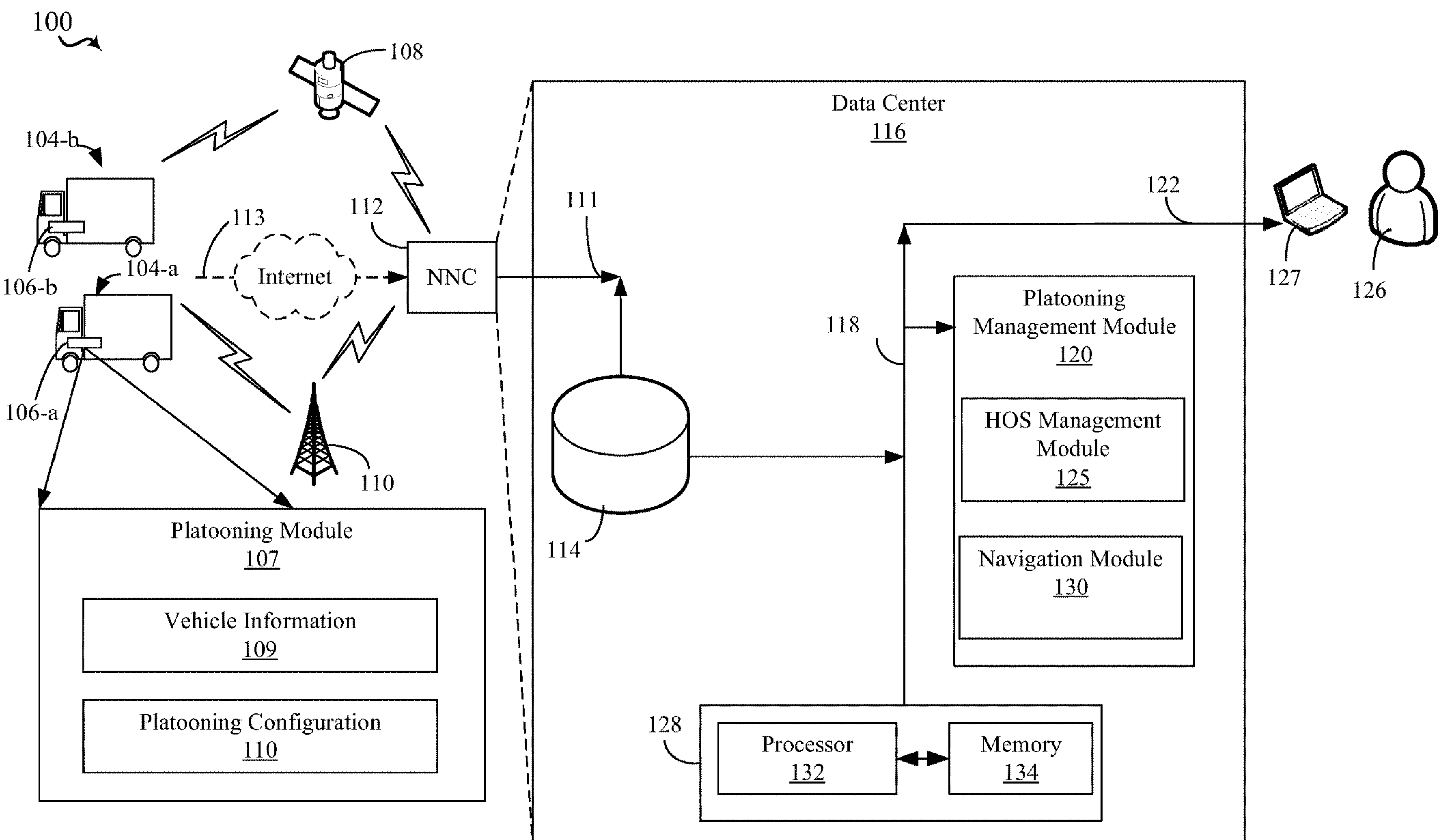
FIG. 1 is a functional block diagram of example elements of a system in accordance with various aspects of the present disclosure.

Implementing an efficient vehicle platooning system, such as for fleet vehicles (e.g., trucks), extends beyond the first impression technical issues associated with connectivity and automated driving support systems. Instead, a more holistic approach—as implemented in present disclosure—is needed in coordinating the logistics of organizing and navigating the platooning convoy based in part on HOS requirements, customer constraints, and/or service time constraints, among other factors, of each candidate vehicle.

For example, in recent decades, significant attention has been called to the issue of safety among truck drivers. In particular, the fact that many drivers may drive for long hours, and may thus be at a lowered sense of alertness, is thought to have contributed to a number of highway accidents and fatalities. Accordingly, such perception has led to legislation and regulations that seek to determine how much and how often a truck driver may drive, and dictate the amount and frequency of rest periods. Generally, in order to comply with the legislation and regulations, truck drivers maintain an accurate driver log that records time periods when the driver is on-duty and driving, on-duty but not driving, off-duty, and resting/sleeping. Based on such information, a driver may be able to determine his or her allowable hours of service (HOS) (e.g., a time value that the driver may be on-duty). In some examples, HOS rules may require a trucker to take a 30-minute rest after eight hours of driving, or to stop for a longer period after driving for 11 hours. The fact that a truck may be part of a platooning convoy does not alleviate the need for a driver to comply with the federal HOS requirements.

Thus, a truck platooning system that either fails to account for or operates with a presumption that all vehicles, when initiating the platooning, are similarly situated with respect to HOS availability for drivers associated with the vehicles, may not provide a practical solution for the trucking industry. Similarly, logistic requirements for each truck in the potential convoy may vary. For example, while a first candidate truck may have tight time constraints (e.g., needing to reach a destination within 24 hours), a second candidate truck may have a longer time availability (e.g., needing to reach a destination in 4-5 days). Further, the availability of the one or more trucks to link for platooning may vary based on the actual service time at the shipping facility (e.g., loading or unloading the truck). Specifically, if the anticipated service time for a truck is beyond the time of the convoy departure, that particular truck may not become available in time for the convoy. Thus, a system is needed that not only accounts for HOS requirements, but also considers when a vehicle needs to be at a particular location of interest (e.g., destination) and the availability of the vehicle based on service time, when organizing a platooning convoy of two or more trucks.

Aspects of the present disclosure solve the above-identified problem by implementing a network-based control computer that coordinates candidate vehicles suited for platooning based at least in part on one or more off the HOS requirements, customer constraints, and/or service time of each candidate vehicle. Further, the network-based control computer may integrate with a navigation system that incorporates one or more of the above factors to manage logistics/routing associated with platooning vehicles.

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples of implementations of the described system based on the principles described herein, but it should be understood that these examples are not intended to limit the scope of the claims. For instance, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined with other features described in other examples.

Referring to FIG. 1, in an aspect, a system 100 includes one or more computer devices, modules, and/or components for controlling vehicles for platooning. As used herein, the terms "module(s)," or "components" may be one of the parts that make up a device, may be hardware or software or firmware, and may be divided into other modules and/or distributed across one or more processors.

In an aspect, system 100 can comprise a network-based control computer (NCC) 112, such as at a network management center, configured to communicate with one or more vehicles 104 via a computer device 106 (e.g., ELD and/or mobile device, etc.) located on each tractor 104 or associated with each driver of each tractor 104. In some systems, the computer device 106 may be more than one device, such as an ELD that may communicate with the mobile device (e.g., a smart phone or an in-cab telematics device). The system 100 may include one or more fleets of vehicles 104. Typically, a fleet could include many tens, hundreds or thousands of vehicles. An example fleet is illustrated as having two vehicles 104. Each computer device 106 may include ELD functionality configured to collect and transmit data associated with the driver to the NCC 112. Also, in some implementations, each computer device 106 and/or its ELD functionality can be configured to perform calculations associated with one or more fleet vehicles using any of the collected data. In some examples, the collected data may include the driver or vehicle data, such as but not limited to one or more of a vehicle identification, a driver identification, the HOS information for the driver, a location of the vehicle 104, and/or telematics information associated with the vehicle 104 and/or driver, which will be collectively referred to as "vehicle information 109." In some examples, telematics is an interdisciplinary field that encompasses telecommunications, vehicular technologies, for instance, road transportation, road safety, electrical engineering (sensors, instrumentation, wireless communications, etc.), and computer science (multimedia, Internet, etc.). To this end, the telematics technology may include transmitting, receiving and storing information (e.g., vehicle and/or driver information) using telecommunication devices to control remote objects such as control one or more applications and aspects of the vehicles (e.g., control the braking and engine of the vehicle).

In an example implementation, the one or more vehicles 104 may be equipped with the computer device 106 in the form of a mobile device in communication with a separate ELD, where the mobile device may function as an in-cab telematics device. In some instances, the mobile device may be a smart phone or tablet configured to receive and process signals and information. In some instances, the ELD may be in communication with the mobile device to allow the collected information to be displayed on the mobile device. To this end, the computer device 106 in the form of either the ELD or the mobile device may include a platooning module 107 to perform one or more functions of the present disclosure, including collecting and transmitting and receiving driver and/or vehicle data to and from a remote NCC 112 and/or configuring the vehicle to participate in a platooning convoy.

Figure 5:
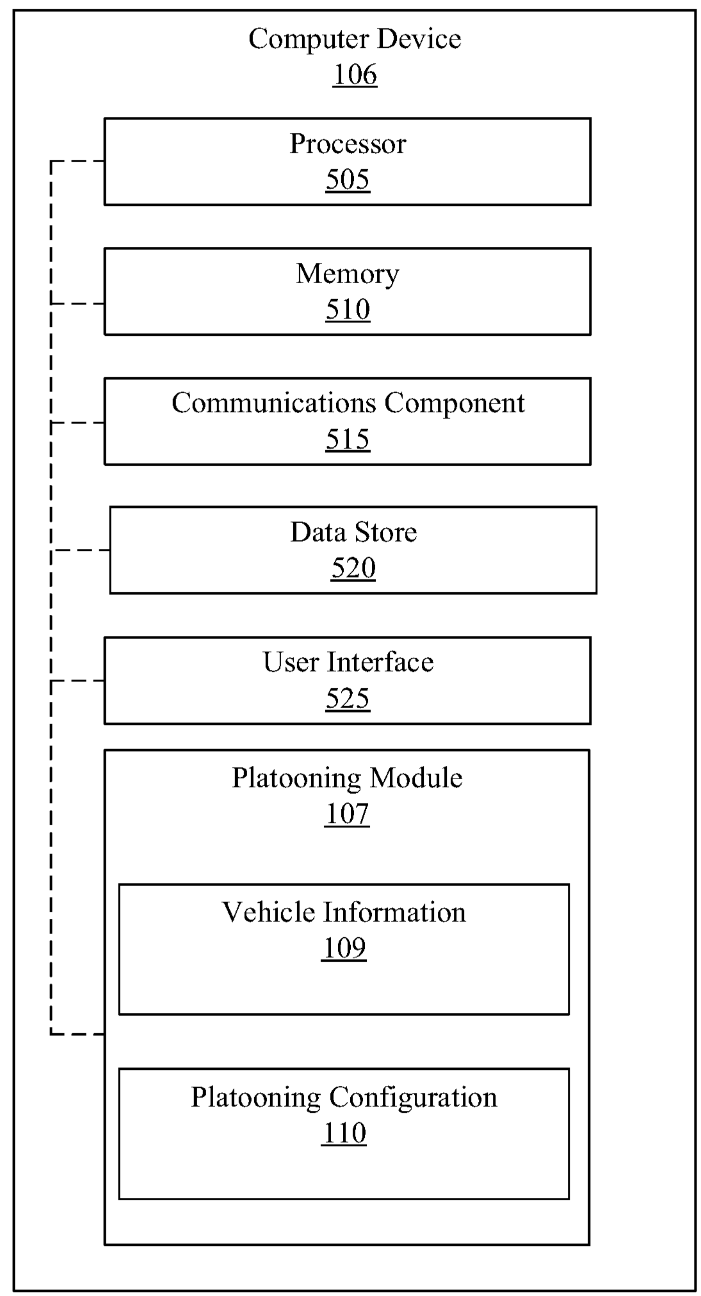
FIG. 5 is a block diagram of an example computer device, such as an ELD and/or mobile device, associated with a vehicle in accordance with the present disclosure.

In some implementations, as shown in FIG. 5 below, the computer device 106 may include a processor configured to execute one or more platooning modules 107 and establish communication with external devices, such as NCC 112, via a communication network (e.g., a terrestrial or satellite-based wireless network). The computer device 106 may also include a memory configured to store computer-readable code that may define all or part of the platooning module 107 and also to store data associated with the module, other components, and/or computer device 106. The computer device 106 may also include a user interface or display, a mobile application server, and a communications module (e.g., including the one or more transceivers, and one or more of terrestrial and Wi-Fi modems, one or more antennae, a GPS and/or satellite communications modem).

As an example only, each vehicle 104 may be in bi-directional communication via the computer device 106 with NCC 112 over at least one communication channel. In the example shown in FIG. 1, each vehicle 104 is in bi-directional communication with the NCC 112 over at least one of a satellite-based communication system 108 or a terrestrial-based system 110 (e.g., a wireless communication system using a communication protocol/technology such as, but not limited to, 5G or New Radio, GSM, CDMA, TDMA, WCDMA, EDGE, OFDM, GPRS, EV-DO, LTE, WiFi, Bluetooth), or, when the vehicle is stopped, via a wired connection 113 through the Internet. In some cases, data may be exchanged with the vehicles 104 using one or both of the satellite communication system 108 and the terrestrial-based communication system 110.

In an aspect, many different types of data are collected and transferred from the vehicles 104 to the NCC 112. Examples of such data include, but are not limited to, vehicle performance data, driver performance data, critical events, messaging and position data, location data, HOS data and many other types of data, which may be collectively referred to as vehicle data 109. All of the information that is communicated to and from the vehicles 104 may be processed via the NCC 112. The NCC 112 can be thought of as a data clearinghouse that receives all data that is transmitted to and received from the vehicles 104. In an aspect, NCC 112 may include one or more back-end servers. Thus, in some aspects, the collected information may periodically (e.g., every x minutes, where x is a whole number, or once a day, or upon availability of a wired or wireless connection) be transmitted from the computer device 106 to the NCC 112 for analysis and record keeping.

In some cases, the system 100 also may include a data center 116, which may be part of or in communication with NCC 112. The data center 116 illustrates one possible implementation of a central repository for all of the data received from each of the vehicles 104. As an example, as mentioned above many different types of data are transmitted from the computer devices 106 associated with each of the vehicles 104 to the NCC 112. In the case where data center 116 is in communication with NCC 112, the data may be transmitted via connection 111 to the data center 116. The connection 111 may comprise any wired or wireless dedicated connection, a broadband connection, or any other communication channel configured to transport the data. Moreover, in an aspect, data center 116 may include one or more back-end servers analyzing the data transmitted from the one or more computer devices 106. Additionally or alternatively, data may also be exchanged between the plurality of computer devices 106 using, for example, peer-to-peer (P2P) communication without the involvement of the NCC 112.

In an aspect, the data center 116 may include a data warehouse 114 for receiving the data from the computer device 106 relating to the vehicle 104. In an aspect, for example, data center 116 may include any number of application servers and data stores, where each may be associated with a separate fleet and/or driver management or performance data. In an aspect, each application server and data store may include a processor, memory including volatile and non-volatile memory, specially-programmed operational software, a communication bus, an input/output mechanism, and other operational systems. For example, an application server may be a services portal (SP) server that receives, for example, messaging and positioning (M/P) data from each of the vehicles 104. Another application server, for example only, may include one or more servers related to safety and compliance, such as a quick deployment center (QDC) server that receives, for example, critical event (CE) data from each of the vehicles 104. Further, for example, another application server may be vehicle and driver performance data related to HOS, fuel usage, and/or cost from each of the vehicles 104. It should be understood that the above list of example servers is for illustrative purposes only, and data center 116 may include additional and/or different application servers.

According to the present aspects, the NCC 112 and/or the data center 116 may include a platooning management module 120 for organizing and routing one or more vehicles 104 in a platoon convoy based in part on factors such as HOS of the drivers, customer constraints (e.g., pick-up and/or delivery times), service time requirements, preferred routes, etc. For purposes of the present disclosure, customer constraints, service time requirements, and preferred routes, among other factors, may be broadly referred to as "logistics constraints." The platooning management module 120 may further include an HOS management module 125 for determining the vehicles that may be candidates for platooning based on whether the driver for the vehicle 104 satisfies an HOS threshold. Additionally, the HOS management module 125 may be in communication with a navigation module 130, which may calculate navigation routes, to account for when the vehicles 104 may need to stop for rest in order to maintain compliance with federal HOS requirements. The navigation module 130 may further calculate and provide instructions to one or more vehicles 104 as to when and where (time and location) that the vehicle 104 needs to be in order to be linked up with the organized platooning convoy. Additionally, the navigation module 130 may instruct the route undertaken by the platooning convoy of two or more vehicles, and when each vehicle needs to "break off" or depart from the platooning convoy in order to travel to its intended destination. It should be noted that although the HOS management module 125 and the navigation module 130 may, in some implementations, be a part of the platooning management module 120, in other implementations each of these components may be a separate part of the NCC 112.

Thus, in some aspects, the NCC 112 may include receiving, via a communication network, a plurality of electronic signals conveying a plurality of vehicle information for a plurality of vehicles, each vehicle information including at least a vehicle identifier of the vehicle, a driver identifier of a driver of the vehicle, available HOS for each driver associated with the plurality of vehicles, and vehicle location information, wherein the plurality of vehicles are equipped with communication and safety systems that facilitate vehicle platooning. The NCC may identify a first subset of the plurality of vehicles that are candidates for platooning in a geographic area based on the plurality of vehicle information, and select at least one second subset of vehicles to be included in at least one platooning convoy from the first subset of the plurality of vehicles that are candidates for platooning in the geographic area based in part on the available HOS for the each driver. The NCC 112 may further include transmitting, via the communication network, a platooning configuration to the at least one second subset of vehicles for initiating the at least one platooning convoy.

In some aspect, the NCC 112 may further communicate with a terminal device 127, which can be a user interface portal, a web-based interface, a personal computer (PC), a laptop, a personal data assistant (PDA), a smart phone, a dedicated terminal, a dumb terminal, or any other device over which a user 126, such as a manager or operator responsible for monitoring a fleet of vehicles 104, may communicate via one or more communication links 118, 122.

In an aspect, the NCC 112 and/or the data center 116 may include a processor 132 and a memory 134 to respectively execute and store instructions and data associated the operation of the data center 116, such as to operate the platooning management module 120. Although shown as residing within the data center 116, the analysis engine 128 may reside elsewhere, and may be implemented as a distributed system in which the processor 132 and the memory 134 may include one or more processor and memories, and may be located in different places, such as at NCC 112 and/or one or more servers associated with NCC 112 or data center 212.

Figure 2A:
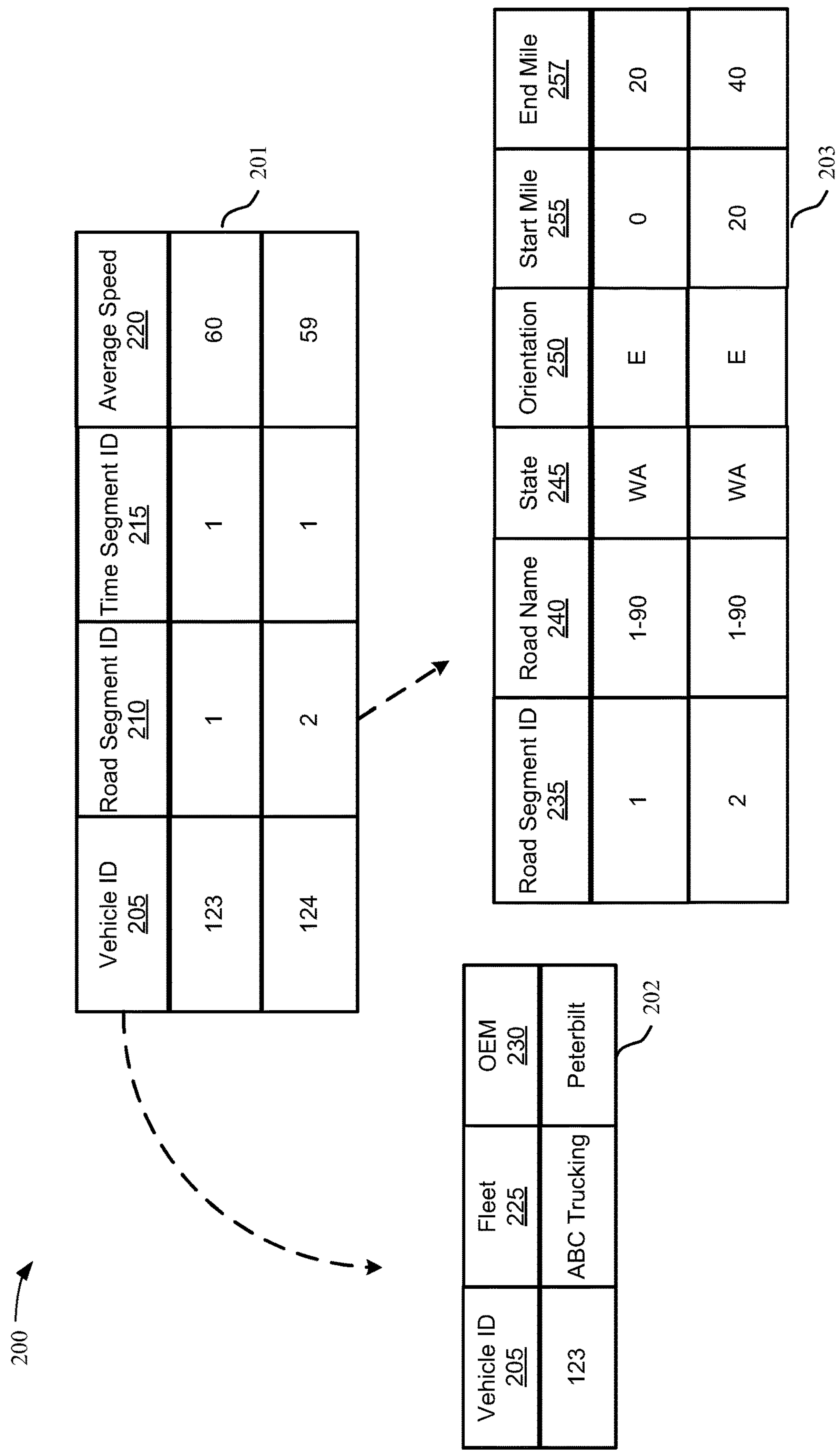
FIGS. 2A and 2B are tables of example data collected and processed by the network control center for facilitating platooning of vehicles in accordance with aspects of the present disclosure.
Figure 2B:
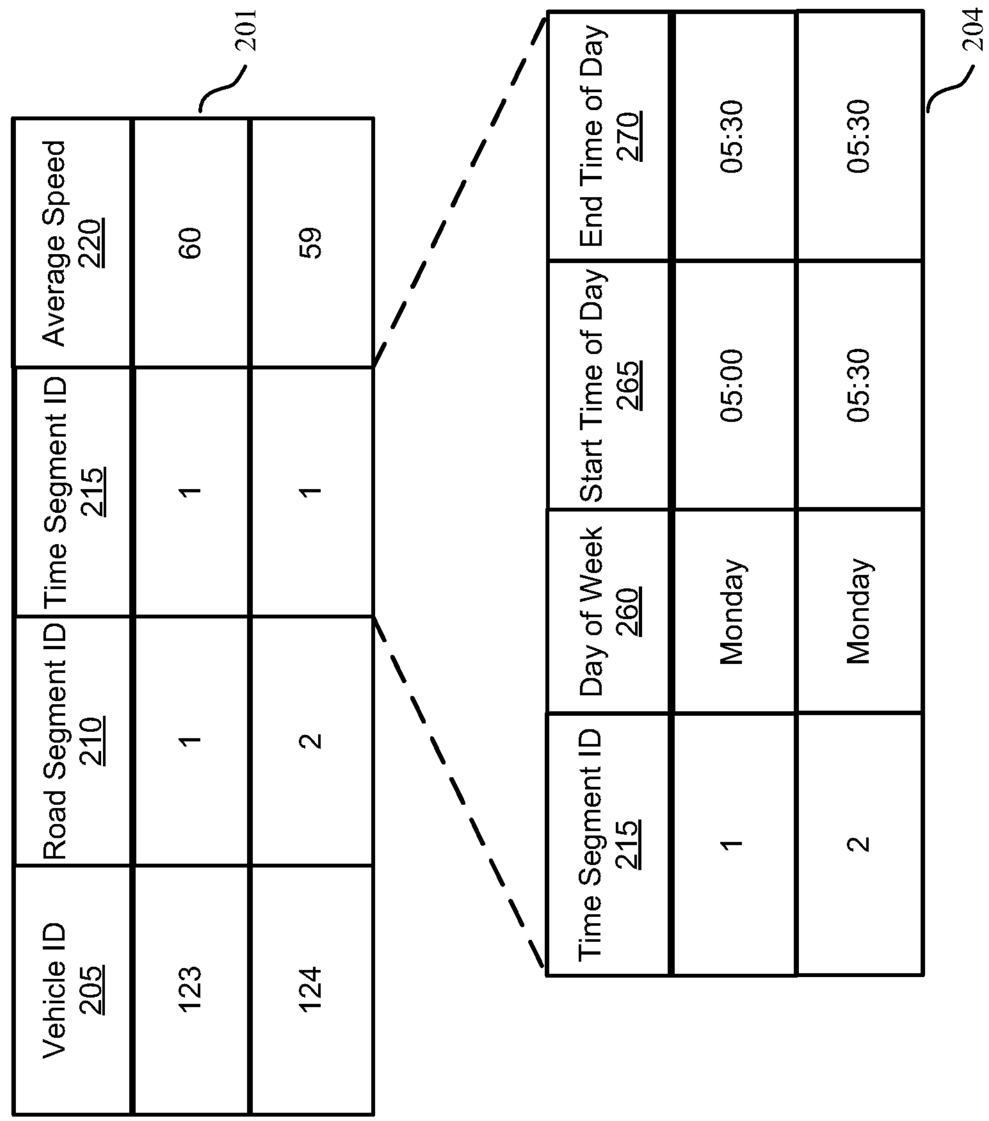

Referring to FIGS. 2A and 2B, example data tables 200 include examples of data generated by the NCC 112 for facilitating platooning of vehicles 104 in accordance with aspects of the present disclosure. In some examples, the NCC 112 may maintain primary data table 201 that is established based on collected information (e.g., vehicle information and/or HOS information (individually and collectively "vehicle information 109) from various entities and vehicles, including the computer 106 included in each vehicle 104. It should also be appreciated that the NCC 112 may configure platooning across different fleet operators having different equipment. As such, features of the present disclosure are not limited to providing support for only vehicles that are part of same fleet, but may be implemented across multiple fleets.

In some examples, the generated primary data table 201 may include vehicle identity (ID) 205, road segment ID 210, time segment 215, and average speed 220 of each vehicle 104 in a particular geographic area that may be candidates for platooning. The vehicle ID 205 may be associated with and/or referenced in conjunction with a vehicle lookup table 202 that identifies each vehicle based in part on the fleet 225 (e.g., trucking company) that the vehicle is part of, in addition to the original equipment manufacturer (OEM) 230 that may identify the type of platooning hardware that the vehicle may be equipped with.

The road segment ID 21.0 may be associated with and/or referenced in conjunction with a platooning road lookup table 203 that includes all platoon authorized roads (e.g., the highways and freeways that may be suitable for platooning of trucks). The platooning road lookup table 203 may be broken up into buckets that make it easy for the NCC 112 to identify high-density truck areas. To this end, the platooning road lookup table 203 may include a road segment ID 235, road name 240, state 245, orientation 250, start mile 255, and end mile 257. Thus, based on the platooning road lookup table 203, the NCC 112 may be able to identify the location where platooning may be suitable (e.g., on 1-90, east bound in state of Washington from 0-40 mile markers). Identification of the road segments that may support platooning may be provided to the computer devices 106 along with the routing information.

Further, referring to FIG. 2B, the time segment ID 215 of the primary data table 201 may include time segment lookup table 204 with information related to times of day that segments of roads may have high-density truck times based on number of trucks generally on the road at specific time period and average speed of the vehicles 106. For example, the information related to times of day may include day of the week 260, start time of day 265 and end time of day 270. In some examples, the time segment table may be used to predict and recommend trip start times that result in the greatest likelihood of trucks encountering a viable platoon partner. The bucketing technique may also be used in real time to track current and future truck densities, thereby decreasing the computation time needed to determine current and future platoon combinations between a plurality of trucks.

Figure 3:
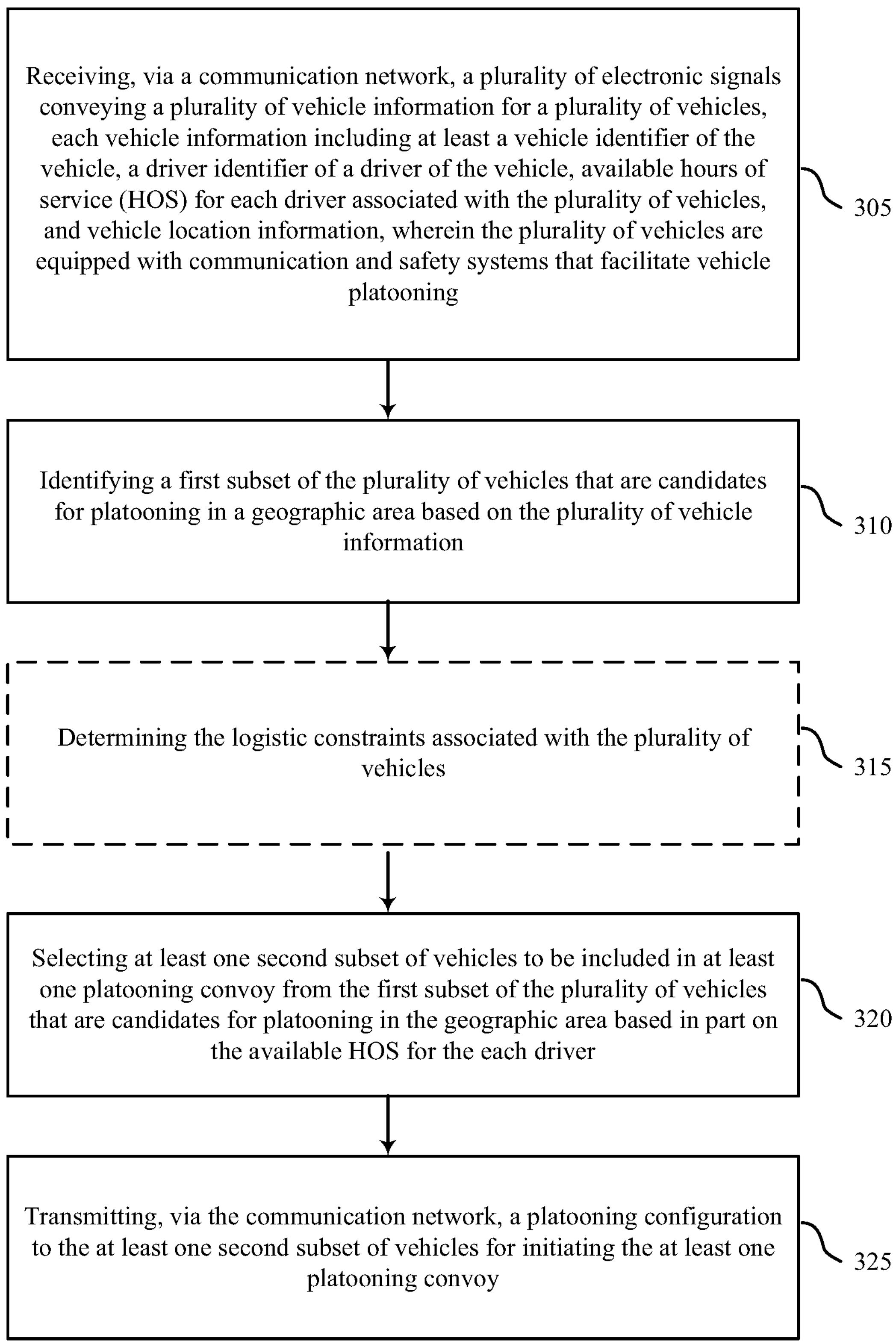
FIG. 3 is a flowchart of an example method for managing fleet vehicles for platooning in accordance with various aspects of the present disclosure.

Referring to FIG. 3, one example of a method 300 for managing fleet vehicles for platooning in accordance with various aspects of the present disclosure may be performed by the NCC 112 discussed with reference to FIG. 1.

At block 305, the method 300 may receiving, via a communication network, a plurality of electronic signals conveying a plurality of vehicle information for a plurality of vehicles. Each vehicle information may include at least a vehicle identifier of the vehicle, a driver identifier of a driver of the vehicle, available hours of service (HOS) for each driver associated with the plurality of vehicles, and vehicle location information. In some examples, the plurality of vehicles may be equipped with communication and safety systems that facilitate vehicle platooning. Thus, in some instances, out of the entire fleet of vehicles (e.g., 500 vehicles), only a subset of vehicles may include the necessary equipment (e.g., vehicle to everything (V2X) communication capabilities, automated braking system to react to the leader vehicle, etc.) to function in platooning convoy.

The presence or absence of platooning equipment may help the NCC 112 narrow the list of platooning candidate vehicles that may be selected for platooning. In some examples, as discussed in detail below, the NCC 112 may further narrow the list of candidate vehicles based in part on the destination and preferred route (e.g., logistic constraints). Thus, in practice, the NCC 112 may only select vehicles for platooning that are not only equipped with the requirement hardware, but may also be traveling the same direction. Aspects of block 305 may be performed by the platooning management module 125 described with reference to FIG. 2.

Further, as part of NCC 112 receiving a plurality of electronic signals conveying a plurality of vehicle information for a plurality of vehicles, one such information may be available HOS for each driver associated with the plurality of vehicles. The available HOS may be received from a computer device included in each of the plurality of vehicles. In some examples, the HOS information may be collected by the computer device 106 included in each vehicle 104 and collected information may periodically (e.g., every x minutes, where x is a whole number, or once a day, or upon availability of a wired or wireless connection) be transmitted from the computer device 106 to the NCC 112 for analysis. In some examples, the collected information, including the HOS information may also be transferred over the communication link (e.g., cellular, satellite, or WiFi) to the NCC 112, and received at the communication component 415 (see FIG. 4). The HOS information may then be processed by the HOS management module 125 included at the NCC 112 for filtering the candidate vehicles (see description with reference to block 320 below) based at least in part on the HOS availability of each driver from the vehicles that are equipped with platooning compliant hardware and are set to travel the same direction during a predetermine time period (e.g., within the next 24 or 48 hours).

At block 310, the method 300 may include identifying a first subset of the plurality of vehicles that are candidates for platooning in a geographic area based on the plurality of vehicle information. For example, the NCC 112 may identify vehicles in a geographic area (e.g., within 50 miles of a point-of-interest) that may be equipped with necessary platooning equipment. Specifically, as discussed above, each vehicle 104 may be in bi-directional communication via the computer device 106 with NCC 112 over at least one communication channel. To this end, data—including vehicle location information of each vehicle—may be exchanged from the vehicles 104 to the NCC 112 using one or both of the satellite communication system 108 and/or the terrestrial-based communication system 110. The vehicle location information of each vehicle may allow the NCC 112 to establish a geographic area (e.g., setting a geographic area of 50 miles) in order to filter and identify the vehicles that may be within the set geographic area.

At block 315, the method 300 may optionally include determining logistic constraints for the plurality of vehicles. Specifically, to identify the logistic constraints, the NCC 112 may access a database that maintains logistic constraints associated with the plurality of vehicles. The logistic constraints may include one or more of customer time requirements, parking availability constraints, service time, or navigation route for the plurality of vehicles. Based on the information retrieved from the database, the NCC 112 may identify the logistic constraints of each vehicle of the first subset of the plurality of vehicles and select the at least one second subset of vehicles from the first subset of the plurality of vehicles based on a determination that the logistic constraints of the at least one second subset of vehicles are compatible for the at least one platooning convoy. Thus, if the NCC 112 determines that the customer time requirements (e.g., delivery timeline) does not allow for reasonable variation (e.g., 1-2 extra days), the NCC 112 may determine to exclude one or more vehicles 104 that would otherwise be available for platooning. Additionally or alternatively, based on the customer time requirements, the NCC 112 may configure a navigation route that allows one or more vehicles to participate in the platooning convoy for a portion of the route, and then "break off" or cease participation in the platooning convoy for the remaining trip. As such, the one or more vehicles 104 would benefit from the safety and lower fuel consumption by participating in the platooning convoy for a portion of the convoy, while complying with the customer time constraints. Similarly, with respect to the parking availability constraints, the NCC 112 may calculate the distance that each vehicle in the platooning convoy may be able to travel within the available HOS that may be remaining for each driver. In addition, the NCC 112 may identify one or more available parking or rest stops along the navigation route that the convoy would be able to reach within the available HOS as an additional criteria in selecting and planning the platooning convoy route. Aspects of block 315 may be performed by the platooning management module 125 described with reference to FIG. 1.

At block 320, the method 300 may include selecting at least one second subset of vehicles to be included in at least one platooning convoy from the first subset of the plurality of vehicles that are candidates for platooning in the geographic area based in part on the available HOS for the each driver. In some examples, selecting the at least one second subset of vehicles may include determining whether the available HOS for each driver associated with the plurality of vehicles satisfies a HOS threshold (e.g., if the available HOS exceed or are less than 10 drivable hours remaining). The method may include selecting the at least one second subset of vehicles to be included in the platooning convoy from the first subset of the plurality of vehicles based on determining that the available HOS for each driver of the at least one second subset of vehicles exceeds the HOS threshold. In other examples, the method may include excluding one or more vehicles from the first subset of the plurality of vehicles that are candidates for platooning convoy based on determining that the available HOS for the one or more vehicles is less than the HOS threshold. Aspects of block 320 may be performed by the platooning management module 125 described with reference to FIG. 1.

At block 325, the method 300 may include transmitting, via the communication network, a platooning configuration to the at least one second subset of vehicles for initiating the at least one platooning convoy. In some examples, the method may include determining, at the NCC 112, a time that each vehicle in the second subset of vehicles needs to reach a location of interest, and organizing the platooning convoy based at least in part on determining the time. The location of interest may include one or more of destination location, intermediate location, rest stop, or parking location. In some aspects, organizing the platooning convoy may include the ordering the vehicles in a particular order (e.g., which vehicle acts as a lead vehicle, and which vehicle as the following vehicle). In some aspects, the organization may be based on the length of time the vehicle will participate in the platooning convoy prior to "breaking off" For example, if a vehicle will only be participating in 30% of the entire platooning journey (or would need to break off first to continue its journey separately), the NCC 112 may organize the platooning convoy to order the said vehicle to the back of the platooning convoy such that the vehicle can cease participation in the platooning convoy from the back of the convoy without affecting the rest of the convoy. Aspects of block 325 may be performed by platooning management module 125 and the navigation module 130 described with reference to FIG. 1.

Further, the method 300 may optionally include determining a navigation route for the platooning convoy. In some examples, the NCC 112 may transmit the navigation route to the subset of vehicles in the platooning convoy (e.g., to the electronic logging devices or computer device 107) via the communication component 415 described with reference to FIG. 1. In some examples, the method may include determining a length of the navigation route that each vehicle in the subset of vehicles remains with the platooning convoy, and transmitting instructions to each vehicle in the subset of vehicles notifying of the length of the navigation route that each vehicle remains as part of the platooning convoy. Further, aspects of block 330 may be performed by the navigation module 130 described with reference to FIG. 1.

Figure 4:
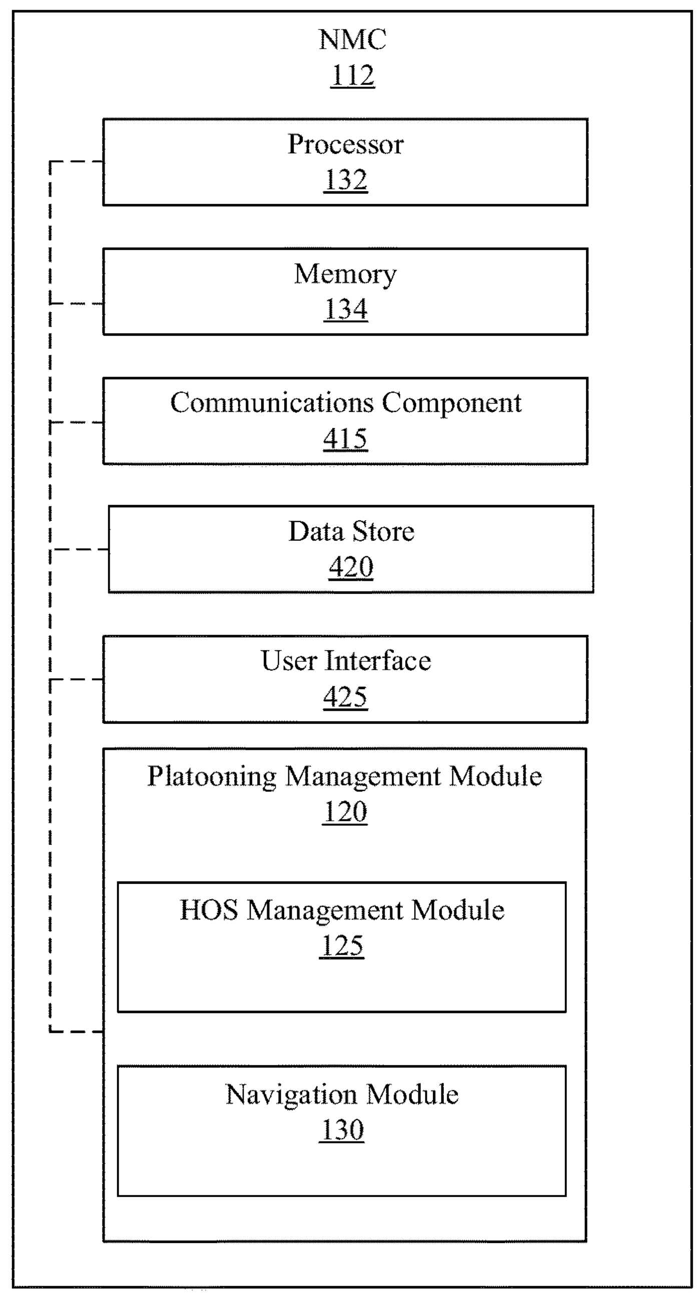
FIG. 4 is a block diagram of an example of a network-based control computer (NCC) in accordance with the present disclosure.

Referring to FIG. 4, in an example that should not be construed as limiting, the NCC 112, may include additional components that operate in conjunction with platooning management module 120 and may be implemented in specially programmed computer readable instructions or code, firmware, hardware, or some combination thereof.

In an aspect, for example, features described herein with respect to the functions of platooning management module 120 may be implemented in or executed using one or any combination of processor 132, memory 134, communications module 415, and data store 420. For example, platooning management module 120 may be defined or otherwise programmed as one or more processor modules of processor 132. Further, for example, platooning management module 120 may be defined as a computer-readable medium (e.g., a non-transitory computer-readable medium) stored in memory 134 and/or data store 420 and executed by processor 132. Moreover, for example, inputs and outputs relating to operations of platooning management module 120 may be provided or supported by communications module 415, which may provide a bus between the modules of NCC 112 or an interface for communication with external devices or modules.

Processor 132 can include a single or multiple set of processors or multi-core processors. Moreover, processor 132 can be implemented as an integrated processing system and/or a distributed processing system. Memory 134 may operate to allow storing and retrieval of data used herein and/or local versions of applications and/or software and/or instructions or code being executed by processor 132, such as to perform the respective functions of platooning management module 120 described herein. Memory 134 can include any type of memory usable by a computer, such as random access memory (RAM), read only memory (ROM), tapes, magnetic discs, optical discs, volatile memory, non-volatile memory, and any combination thereof.

Communications module 415 is operable to establish and maintain communications with one or more internal components/modules or external devices utilizing hardware, software, and services as described herein. Communications component 415 may carry communications between modules on NCC 112, as well as between user and external devices, such as devices located across a communications network and/or devices serially or locally connected to NCC 112. For example, communications component 415 may include one or more buses, and may further include transmit chain modules and receive chain modules associated with a transmitter and receiver, respectively, or a transceiver, operable for interfacing with external devices.

Additionally, data store 420, which can be any suitable combination of hardware and/or software, which provides for mass storage of information, databases, and programs employed in connection with aspects described herein. For example, data store 420 may be a data repository for applications not currently being executed by processor 232.

The NCC 112 may additionally include a user interface module 425 operable to receive inputs from a user, and further operable to generate outputs for presentation to the user. User interface module 425 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 425 may include one or more output devices, including but not limited to a display, a speaker, a haptic feedback mechanism, a printer, any other mechanism capable of presenting an output to a user, or any combination thereof.

Referring to FIG. 5, in an example that should not be construed as limiting, the computer device 106, may include additional components that operate in conjunction with platooning module 107 and may be implemented in specially programmed computer readable instructions or code, firmware, hardware, or some combination thereof. In some examples, the computer device 106 may be included or mounted within (or outside) of each vehicle 104 in order to collect vehicle and driver data, and maintaining communication with the remote NCC 112.

In an aspect, for example, features described herein with respect to the functions of platooning module 107 may be implemented in or executed using one or any combination of processor 505, memory 510, communications module 515, and data store 520. For example, platooning module 107 may be defined or otherwise programmed as one or more processor modules of processor 505. Further, for example, platooning module 107 may be defined as a computer-readable medium (e.g., a non-transitory computer-readable medium) stored in memory 510 and/or data store 520 and executed by processor 505. Moreover, for example, inputs and outputs relating to operations of platooning module 107 may be provided or supported by communications module 515, which may provide a bus between the modules of computer device 106 or an interface for communication with external devices or modules (e.g., NCC 112).

In some aspects, the platooning module 107 may of the computer device 106 may be configured to transmit, via a communication network, a plurality of electronic signals (e.g., vehicle information 109) conveying a plurality of vehicle information for the vehicle 104. Each vehicle information may include one or more of a vehicle identifier of the vehicle, a driver identifier of a driver of the vehicle, available HOS for each driver associated with the plurality of vehicles, and/or vehicle location information. In some examples, the platooning module 107 may further identify to the NCC 112 whether the vehicle is equipped with communication and safety systems that facilitate vehicle platooning. The platooning module 107 may further provide NCC 112 information associate with logistic constraints that may be associated with the vehicle 106 and/or the driver. In some examples, the logistic constraints may include one or more of a customer time requirement, a parking availability constraint, a service time constraint, or a navigation route for the plurality of vehicles. The platooning module 107 may further provide information such as a destination location, an intermediate location, a rest stop, or a parking location (individually and collectively, "location of interest") that the vehicle 106 and/or the driver need to reach within a time period (e.g., if the driver will be running out of available HOS within 4 hours, the platooning module 107 may locate a parking location or rest stop where the vehicle may stop prior to the expiration of the available HOS).

The platooning module 107, in some examples, may receive, via the communication network, a platooning configuration 110 for initiating the at least one platooning convoy with at least one additional vehicle 106. The platooning configuration 110 may provide information to the vehicle 106 of the location where the platooning convoy would be initiated and the time at which the vehicles will form the platooning convoy. Additionally, the platooning configuration 110 may provide information associated to the order that trucks would be organized (e.g., based on vehicle position within the platooning convoy), the route for the platooning convoy to take to reach a destination, and how long the vehicle would remain part of the platooning convoy.

Processor 505 can include a single or multiple set of processors or multi-core processors. Moreover, processor 505 can be implemented as an integrated processing system and/or a distributed processing system. Memory 510 may operate to allow storing and retrieval of data used herein and/or local versions of applications and/or software and/or instructions or code being executed by processor 505, such as to perform the respective functions of platooning module 107 described herein. Memory 510 can include any type of memory usable by a computer, such as random access memory (RAM), read only memory (ROM), tapes, magnetic discs, optical discs, volatile memory, non-volatile memory, and any combination thereof.

Communications module 515 is operable to establish and maintain communications with one or more internal components/modules or external devices utilizing hardware, software, and services as described herein. Communications component 515 may carry communications between the modules on the computer device 106, as well as between user and external devices, such as devices located across a communications network and/or devices serially or locally connected to computer device 106. For example, communications component 515 may include one or more buses, and may further include transmit chain modules and receive chain modules associated with a transmitter and receiver, respectively, or a transceiver, operable for interfacing with external devices.

Additionally, data store 520, which can be any suitable combination of hardware and/or software, which provides for mass storage of information, databases, and programs employed in connection with aspects described herein. For example, data store 520 may be a data repository for applications not currently being executed by processor 505.

The computer device 106 may additionally include a user interface module 525 operable to receive inputs from a user, and further operable to generate outputs for presentation to the user. User interface module 525 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 525 may include one or more output devices, including but not limited to a display, a speaker, a haptic feedback mechanism, a printer, any other mechanism capable of presenting an output to a user, or any combination thereof.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. 1-4 which may illustrate various process flows.

As used in this description, the terms "module," "components," "database," "module," "system," and the like are intended to refer to a computer-related entity, either hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device may be a module. One or more modules may reside within a process and/or thread of execution, and a module may be localized on one computer and/or distributed between two or more computers. In addition, these modules may execute from various computer readable media having various data structures stored thereon. The modules may communicate by way of local and/or remote processes such as in accordance with a signal having one or more data packets (e.g., data from one module interacting with another module in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method executable by a network-based control computer for controlling vehicles for platooning, comprising:

receiving, via a communication network, a plurality of electronic signals conveying a plurality of vehicle information for a plurality of vehicles, each vehicle information comprises at least a vehicle identifier of the vehicle and vehicle location information, wherein the plurality of vehicles are equipped with communication and safety systems that facilitate vehicle platooning;

identifying a first subset of the plurality of vehicles that are candidates for platooning in a geographic area based on the plurality of vehicle information and the plurality of vehicles equipped with communication and safety systems that facilitate vehicle platooning;

selecting at least one second subset of vehicles to be included in at least one platooning convoy from the first subset that are candidates for platooning in the geographic area based in part on logistic constraints for each vehicle identified in the first subset; and transmitting, via the communication network, a platooning configuration to the at least one second subset of vehicles for initiating the at least one platooning convoy, whereby the vehicles in the second subset of vehicles form at least one platooning convoy in accordance with the transmitted platooning configuration.

2. The method of claim 1, wherein selecting the at least one second subset of vehicles to be included in the at least one platooning convoy comprises:

accessing a database that includes logistic constraints associated with the plurality of vehicles, identifying the logistic constraints of each vehicle of the first subset of the plurality of vehicles; and selecting the at least one second subset of vehicles from the first subset of the plurality of vehicles based on a determination that the logistic constraints of the at least one second subset of vehicles are compatible for the at least one platooning convoy.

3. The method of claim 1, wherein the logistic constraints include a navigation route for the plurality of vehicles and one or more of a customer time requirement, a parking availability constraint, or a service time constraint.

4. The method of claim 1, further comprising:

determining a time that each vehicle in the at least one second subset of vehicles needs to reach a location of interest; and organizing the platooning convoy based at least in part on determining the time.

5. The method of claim 4, wherein the location of interest includes one or more of a destination location, an intermediate location, a rest stop, or a parking location.

6. The method of claim 1, wherein transmitting the platooning configuration to the at least one second subset of vehicles for initiating the at least one platooning convoy comprises:

determining a navigation route for the platooning convoy; and transmitting the navigation route to the at least one second subset of vehicles in the platooning convoy.

7. The method of claim 6, further comprising:

determining a length of the navigation route that each vehicle in the at least one second subset of vehicles remains with the platooning convoy; and transmitting instructions to each vehicle in the at least one second subset of vehicles notifying of the length of the navigation route that each vehicle remains as part of the platooning convoy.

8. The method of claim 1, wherein each vehicle information further comprises a driver identifier of a driver.

9. A network-based control computer for controlling vehicles for platooning, comprising:

a memory configured to store instructions; and a processor communicatively coupled with the memory, the processor configured to execute the instructions to:

receive, via a communication network, a plurality of electronic signals conveying a plurality of vehicle information for a plurality of vehicles, each vehicle information including at least a vehicle identifier of the vehicle and vehicle location information, wherein the plurality of vehicles are equipped with communication and safety systems that facilitate vehicle platooning;

identify a first subset of the plurality of vehicles that are candidates for platooning in a geographic area based on the plurality of vehicle information and the plurality of vehicles equipped with communication and safety systems that facilitate vehicle platooning;

select at least one second subset of vehicles to be included in at least one platooning convoy from the first subset that are candidates for platooning in the geographic area based in part on logistic constraints for each vehicle identified in the first subset; and transmit, via the communication network, a platooning configuration to the at least one second subset of vehicles for initiating the at least one platooning convoy, whereby the vehicles in the second subset of vehicles form at least one platooning convoy in accordance with the transmitted platooning configuration.

10. The network-based control computer of claim 9, wherein the instructions to select the at least one second subset of vehicles to be included in the at least one platooning convoy are further configured to be executed to:

access a database that includes logistic constraints associated with the plurality of vehicles, identify the logistic constraints of each vehicle of the first subset of the plurality of vehicles; and select the at least one second subset of vehicles from the first subset of the plurality of vehicles based on a determination that the logistic constraints of the at least one second subset of vehicles are compatible for the at least one platooning convoy.

11. The network-based control computer of claim 9, wherein the logistic constraints include a navigation route for the plurality of vehicles and one or more of a customer time requirement, a parking availability constraint, or a service time constraint.

12. The network-based control computer of claim 9, wherein the processor is further configured to execute the instructions to:

determine a time that each vehicle in the at least one second subset of vehicles needs to reach a location of interest; and organize the platooning convoy based at least in part on determining the time.

13. The network-based control computer of claim 12, wherein the location of interest includes one or more of a destination location, an intermediate location, a rest stop, or a parking location.

14. The network-based control computer of claim 9, wherein the instructions to transmit the platooning configuration to the at least one second subset of vehicles for initiating the at least one platooning convoy are further configured to be executed to:

determine a navigation route for the platooning convoy; and transmit the navigation route to the at least one second subset of vehicles in the platooning convoy.

15. The network-based control computer of claim 14, wherein the processor is further configured to execute the instructions to:

determine a length of the navigation route that each vehicle in the at least one second subset of vehicles remains with the platooning convoy; and transmit instructions to each vehicle in the at least one second subset of vehicles notifying of the length of the navigation route that each vehicle remains as part of the platooning convoy.

16. The network-based control computer of claim 9, wherein each vehicle information further comprises a driver identifier of a driver.

17. A non-transitory computer readable medium storing instructions, executable by a processor of a network-based control computer for controlling vehicles for platooning, comprising instructions for:

receiving, via a communication network, a plurality of electronic signals conveying a plurality of vehicle information for a plurality of vehicles, each vehicle information comprises at least a vehicle identifier of the vehicle and vehicle location information, wherein the plurality of vehicles are equipped with communication and safety systems that facilitate vehicle platooning;

identifying a first subset of the plurality of vehicles that are candidates for platooning in a geographic area based on the plurality of vehicle information and the plurality of vehicles equipped with communication and safety systems that facilitate vehicle platooning;

selecting at least one second subset of vehicles to be included in at least one platooning convoy from the first subset that are candidates for platooning in the geographic area based in part on logistic constraints for each vehicle identified in the first subset; and transmitting, via the communication network, a platooning configuration to the at least one second subset of vehicles for initiating the at least one platooning convoy, whereby the vehicles in the second subset of vehicles form at least one platooning convoy in accordance with the transmitted platooning configuration.

18. The non-transitory computer readable medium of claim 17, wherein selecting the at least one second subset of vehicles to be included in the at least one platooning convoy further include instructions for:

accessing a database that includes logistic constraints associated with the plurality of vehicles, identifying the logistic constraints of each vehicle of the first subset of the plurality of vehicles; and selecting the at least one second subset of vehicles from the first subset of the plurality of vehicles based on a determination that the logistic constraints of the at least one second subset of vehicles are compatible for the at least one platooning convoy.

19. The non-transitory computer readable medium of claim 17, wherein the logistic constraints include a navigation route for the plurality of vehicles and one or more of a customer time requirement, a parking availability constraint, or a service time constraint.

20. The non-transitory computer readable medium of claim 17, wherein each vehicle information further comprises a driver identifier of a driver.

* * * * *